US009294919B2

(12) United States Patent
Merrien et al.

(10) Patent No.: US 9,294,919 B2
(45) Date of Patent: Mar. 22, 2016

(54) METHOD FOR EXPORTING ON A SECURE SERVER DATA COMPRISED ON A UICC COMPRISED IN A TERMINAL

(75) Inventors: Lionel Merrien, Montreal (CA); Xavier Berard, Cadolive (FR)

(73) Assignee: GEMALTO SA, Meudon (FR)

( * ) Notice: Subject to any disclaimer, the term of this patent is extended or adjusted under 35 U.S.C. 154(b) by 119 days.

(21) Appl. No.: 13/991,689

(22) PCT Filed: Dec. 5, 2011

(86) PCT No.: PCT/EP2011/071778
§ 371 (c)(1),
(2), (4) Date: Dec. 11, 2013

(87) PCT Pub. No.: WO2012/076480
PCT Pub. Date: Jun. 14, 2012

(65) Prior Publication Data
US 2014/0122872 A1    May 1, 2014

Related U.S. Application Data

(63) Continuation-in-part of application No. 13/312,309, filed on Dec. 6, 2011.

(30) Foreign Application Priority Data

Dec. 6, 2010  (EP) ..................................... 10306359

(51) Int. Cl.
H04W 12/06 (2009.01)
H04W 4/00 (2009.01)

(52) U.S. Cl.
CPC .............. *H04W 12/06* (2013.01); *H04W 4/001* (2013.01)

(58) Field of Classification Search
CPC .......... H04M 3/16; H04W 12/06; H04W 8/20
See application file for complete search history.

(56) References Cited

U.S. PATENT DOCUMENTS 6,978,152 B1   12/2005  Yamaashi et al.
7,024,390 B1    4/2006  Mori et al.
(Continued)

FOREIGN PATENT DOCUMENTS

CN   101080051 A   11/2007
CN   101179401 A    5/2008
(Continued)

OTHER PUBLICATIONS

Office Action (Notice of Reasons for Rejection) issued on Aug. 19, 2014, by the Japan Patent Office in Japanese Patent Application No. 2013-542497, and an English Translation of the Office Action. (9 pages).
Office Action (Notice of Preliminary Rejection) issued on Jun. 27, 2014, by the Korean Intellectual Property Office, in Korean Patent Application No. 10-2013-7017637, and an English Translation of the Office Action. (7 pages).
Office Action (Notice of Preliminary Rejection) issued on Aug. 19, 2014, by the Korean Intellectual Property Office in Korean Patent Application No. 10-2013-7016486, and an English Translation of the Office Action. (6 pages).

(Continued)

*Primary Examiner* — Myron K Wyche
(74) *Attorney, Agent, or Firm* — Buchanan Ingersoll & Rooney PC

(57) ABSTRACT

A method for exporting on a UICC in a terminal. An export request signed by the UICC, is transmitted by the terminal to a secure server. The server verifies the signed export request by comparing the signature and the identity of the UICC. The server sends a signed export certificate to the UICC via the terminal. An export package containing the data is prepared, signed and encrypted by the UICC, and sent to the terminal. The terminal transmits the export package to the server. The server signs an acknowledgment message and transmits it to the UICC via the terminal. In the UICC, the data that have been exported is destroyed, and a signed acknowledge message is sent to the server via the terminal. The server makes the data available for a further transfer to a new terminal or UICC.

3 Claims, 1 Drawing Sheet

(56) References Cited

U.S. PATENT DOCUMENTS

| | | |
|---|---|---|
| 7,146,161 B2 | 12/2006 | Chou |
| 7,349,719 B2 | 3/2008 | Buniatyan |
| 7,363,056 B2 | 4/2008 | Faisy |
| 2002/0186845 A1 | 12/2002 | Dutta et al. |
| 2004/0131186 A1 | 7/2004 | Kasuya et al. |
| 2004/0235523 A1 | 11/2004 | Schrire et al. |
| 2005/0021875 A1 | 1/2005 | Bouthemy et al. |
| 2005/0164737 A1 | 7/2005 | Brown |
| 2005/0186954 A1 | 8/2005 | Kenney |
| 2005/0239504 A1 | 10/2005 | Ishii et al. |
| 2005/0266883 A1 | 12/2005 | Chatrath |
| 2006/0049243 A1 | 3/2006 | Sakamura et al. |
| 2006/0079284 A1 | 4/2006 | Lu et al. |
| 2006/0086785 A1 | 4/2006 | Sakata |
| 2006/0196931 A1 | 9/2006 | Holtmanns et al. |
| 2006/0199614 A1 | 9/2006 | Hyacinthe |
| 2007/0105532 A1 | 5/2007 | Martin et al. |
| 2007/0239857 A1 | 10/2007 | Mahalal et al. |
| 2008/0090614 A1 | 4/2008 | Sicher et al. |
| 2008/0130879 A1 | 6/2008 | Heinonen et al. |
| 2008/0261561 A1* | 10/2008 | Gehrmann ............ 455/411 |
| 2008/0292074 A1 | 11/2008 | Boni et al. |
| 2008/0319823 A1 | 12/2008 | Ahn et al. |
| 2009/0159692 A1 | 6/2009 | Chew et al. |
| 2009/0163175 A1 | 6/2009 | Shi et al. |
| 2009/0191857 A1 | 7/2009 | Horn et al. |
| 2009/0191917 A1 | 7/2009 | Zappulla et al. |
| 2009/0191918 A1 | 7/2009 | Mardiks |
| 2009/0215431 A1 | 8/2009 | Koraichi |
| 2009/0217348 A1 | 8/2009 | Salmela et al. |
| 2009/0307142 A1 | 12/2009 | Mardikar |
| 2010/0179907 A1 | 7/2010 | Atkinson |
| 2011/0028126 A1 | 2/2011 | Lim et al. |
| 2011/0035584 A1 | 2/2011 | Meyerstein et al. |
| 2011/0059773 A1 | 3/2011 | Neumann et al. |
| 2011/0126183 A1 | 5/2011 | Bernard et al. |
| 2011/0136482 A1 | 6/2011 | Kaliner |
| 2011/0237190 A1 | 9/2011 | Jolivet |
| 2011/0302641 A1 | 12/2011 | Hald et al. |
| 2011/0320600 A1 | 12/2011 | Froeding et al. |
| 2012/0028609 A1 | 2/2012 | Hruska |
| 2012/0108295 A1 | 5/2012 | Schell et al. |
| 2012/0113865 A1 | 5/2012 | Zhao et al. |
| 2012/0190354 A1 | 7/2012 | Merrien et al. |
| 2012/0297473 A1 | 11/2012 | Case et al. |
| 2013/0318355 A1 | 11/2013 | Girard et al. |
| 2013/0324091 A1 | 12/2013 | Girard et al. |
| 2013/0329683 A1 | 12/2013 | Berard et al. |
| 2014/0019760 A1 | 1/2014 | Vergnes et al. |
| 2014/0024343 A1 | 1/2014 | Bradley |
| 2014/0031083 A1 | 1/2014 | Vergnes et al. |
| 2014/0057680 A1 | 2/2014 | Proust et al. |
| 2014/0066011 A1 | 3/2014 | Bradley |
| 2014/0141747 A1 | 5/2014 | Merrien et al. |

FOREIGN PATENT DOCUMENTS

| | | |
|---|---|---|
| CN | 101309518 A | 11/2008 |
| DE | 10 2008 033 976 A1 | 1/2010 |
| EP | 1 650 717 A1 | 4/2006 |
| EP | 1 965 596 A1 | 9/2008 |
| EP | 2 056 523 A1 | 5/2009 |
| EP | 2 076 071 A1 | 7/2009 |
| FR | 2 871 020 A1 | 12/2005 |
| GB | 2 457 221 A | 8/2009 |
| JP | 2002-236572 A | 8/2002 |
| JP | 2005-323128 A | 11/2005 |
| JP | 2006-050554 A | 2/2006 |
| JP | 2006-107316 A | 4/2006 |
| JP | 2008-519343 A | 6/2008 |
| JP | 2010-501092 A | 1/2010 |
| JP | 2010-532107 A | 9/2010 |
| JP | 2011-525311 A | 9/2011 |
| JP | 2012-528534 A | 11/2012 |
| KR | 2002-0066032 A | 8/2002 |
| KR | 2003-0044260 A | 6/2003 |
| KR | 10-0489783 B1 | 5/2005 |
| KR | 10-2005-0095424 A | 9/2005 |
| KR | 2007-0095048 A | 9/2007 |
| KR | 10-2008-0014285 A | 2/2008 |
| KR | 10-2008-0015870 A | 2/2008 |
| KR | 10-2009-0056019 A | 6/2009 |
| KR | 10-2010-0095648 A | 8/2010 |
| KR | 10-2010-011642 A | 10/2010 |
| WO | 02/082715 A1 | 10/2002 |
| WO | 03/104997 A1 | 12/2003 |
| WO | 2004/021296 A1 | 3/2004 |
| WO | 2007/058241 A1 | 5/2007 |
| WO | 2008/128874 A1 | 10/2008 |
| WO | WO 2008/123827 A1 | 10/2008 |
| WO | 2009/055910 A1 | 5/2009 |
| WO | 2009/092115 A2 | 7/2009 |
| WO | 2009091837 A1 | 7/2009 |
| WO | 2009/095295 A1 | 8/2009 |
| WO | 2009/103623 A2 | 8/2009 |
| WO | 2009/141024 A1 | 11/2009 |
| WO | 2009/141035 A1 | 11/2009 |
| WO | 2009/149788 A2 | 12/2009 |
| WO | 2010/052332 A1 | 5/2010 |
| WO | 2010068016 A3 | 6/2010 |
| WO | 2010/138592 A2 | 12/2010 |
| WO | 2011139795 A1 | 11/2011 |
| WO | 2011159549 A1 | 12/2011 |
| WO | 2012012526 A1 | 1/2012 |
| WO | 2012058092 A1 | 5/2012 |
| WO | 2012058099 A1 | 5/2012 |
| WO | 2012058429 A2 | 5/2012 |
| WO | 2012058446 A1 | 5/2012 |
| WO | 2012058450 A1 | 5/2012 |
| WO | 2012061516 A1 | 5/2012 |
| WO | 2012061561 A2 | 5/2012 |
| WO | 2012065112 A2 | 5/2012 |

OTHER PUBLICATIONS

Office Action (Notice of Reasons for Rejection) issued on Aug. 5, 2014, by the Japan Patent Office in Japanese Patent Application No. 2013-542474, and an English Translation of the Office Action. (4 pages).

Office Action issued by the U.S. Patent and Trademark Office in the U.S. Appl. No. 13/991,823, mailed Jan. 5, 2015, U.S. Patent and Trademark Office, Alexandria, VA. (25 pages).

Office Action issued by the U.S. Patent and Trademark Office in the U.S. Appl. No. 13/991,846, mailed Feb. 10, 2015, U.S. Patent and Trademark Office, Alexandria, VA. (26 pages).

Office Action issued by the U.S. Patent and Trademark Office in the U.S. Appl. No. 13/992,065, mailed Dec. 18, 2014, U.S. Patent and Trademark Office, Alexandria, VA. (26 pages).

Office Action issued by the U.S. Patent and Trademark Office in the U.S. Appl. No. 13/991,744, mailed Dec. 12, 2014, U.S. Patent and Trademark Office, Alexandria, VA. (33 pages).

Notice of Allowance issued by the U.S. Patent and Trademark Office in the U.S. Appl. No. 13/991,752, mailed Jan. 21, 2015, U.S. Patent and Trademark Office, Alexandria, VA. (30 pages).

Office Action issued by the U.S. Patent and Trademark Office in the U.S. Appl. No. 13/991,766, mailed Mar. 17, 2015, U.S. Patent and Trademark Office, Alexandria, VA. (33 pages).

Office Action issued by the U.S. Patent and Trademark Office in the U.S. Appl. No. 13/992,039, mailed Mar. 17, 2015, U.S. Patent and Trademark Office, Alexandria, VA. (35 pages).

Office Action (Notice of Preliminary Rejection) issued on Feb. 25, 2015, by the Korean Patent Office in Korean Patent Application No. 10-2013-0717638, and an English Translation of the Office Action. (7 pages).

International Search Report (PCT/ISA/210) issued on Feb. 15, 2012, by the European Patent Office as the International Searching Authority for International Application No. PCT/EP2011/071778.

Written Opinion (PCT/ISA/237) issued on Feb. 15, 2012, by the European Patent Office as the International Searching Authority for International Application No. PCT/EP2011/071778.

(56) References Cited

OTHER PUBLICATIONS

English translation of Office Action issued by the Korean Patent Office on Aug. 28, 2014 in corresponding Korean Application No. 10-2013-7016004. (3 pages).
English translation of Office Action issued by the Korean Patent Office on Apr. 16, 2015 in corresponding Korean Application No. 10-2013-7016004. (2 pages).
Office Action issued by the Russian Patent Office dated Dec. 29, 2014 in corresponding Russian Application No. 2013131034, and English translation of Office Action. (6 pages).
Partial European Search Report issued on Jul. 22, 2011, by the European Patent Office in the European Application No. 10 30 6359. (7 pages).
An English Translation of the Office Action (Notice of Reasons for Rejection) issued on Apr. 15, 2014, by the Japan Patent Office in the Japanese Patent Application No. 2013-542477. (3 pages).
"3rd Generation Partnership Project; Technical Specification Group Services and System Aspects; 3G Security; Specification of the MILENAGE Algorithm Set; An example algorithm set for the 3GPP authentication and key generation functions f1, f1*, f2, f3, f4, f5 and f5*; Document 2: Algorithm Specification (Release 11)", 3GPP TS 35.206 V11.0.0 (Sep. 2012), pp. 1-31.
"3rd Generation Partnership Project; Technical Specification Group Services and System Aspects; Feasibility Study on Remote Management of USIM Application on M2M Equipment; (Release 8)", 3GPP TR 33.812 V1.0.0 (Sep. 2008), pp. 1-80.
International Search Report (Form PCT/ISA/210) and the Written Opinion of the International Searching Authority (Form PCT/ISA/237) issued on Feb. 22, 2012, by the European Patent Office in the International Application No. PCT/EP2011/071674. (8 pages).
Madlmayr et al., "The Benefit of using SIM Application Toolkit in the Context of Near Field Communication Applications" International Conference on the Management of Mobile Business, (Jul. 2007), (8 pages).
International Search Report (Form PCT/ISA/210) and the Written Opinion of the International Searching Authority (Form PCT/ISA/237) issued on Feb. 27, 2012, by the European Patent Office in the International Application No. PCT/EP2011/071660. (6 pages).
An English Translation of the Office Action (Notice of Reasons for Rejection) issued on Jun. 17, 2014, by the Japan Patent Office in the Japanese Patent Application No. 2013-542492. (3 pages).
International Search Report (Form PCT/ISA/210) and the Written Opinion of the International Searching Authority (Form PCT/ISA/237) issued on Mar. 28, 2012, by the European Patent Office in the International Application No. PCT/EP2011/071737. (6 pages).
An English Translation of the Office Action (Notice of Reasons for Rejection) issued on Apr. 30, 2014, by the Japan Patent Office in the Japanese Patent Application No. 2013-542496. (2 pages).
International Search Report (Form PCT/ISA/210) and the Written Opinion of the International Searching Authority (Form PCT/ISA/237) issued on Feb. 27, 2012, by the European Patent Office in the International Application No. PCT/EP2011/071781. (11 pages).
"Smart Cards; Card Application Toolkit (CAT) (Release 9)", ETSI TS 102 223, vol. SCP TEC, No. V9.2.0, (Oct. 1, 2010), pp. 1-209.
"IP Based Over-the Air Handset Configuration Management (IOTA-HCM), 3rd Generation Partnership Project 2 3GPP2", 3GPP2 C.S0040, Version 1.0, Jul. 18, 2003, pp. 1-68.
International Search Report (Form PCT/ISA/210) and the Written Opinion of the International Searching Authority (Form PCT/ISA/237) issued on Feb. 22, 2012, by the European Patent Office in the International Application No. PCT/EP2011/071675. (12 pages).
International Search Report (Form PCT/ISA/210) and the Written Opinion of the International Searching Authority (Form PCT/ISA/237) issued on Apr. 4, 2012, by the European Patent Office in the International Application No. PCT/EP2011/071731. (12 pages).
"3rd Generation Partnership Project; Technical Specification Group Services and System Aspects; Service aspects; Service principles (Release 11)", 3GPP TS 22.101 V11.0.0 (Sep. 2010), pp. 1-60.
International Search Report (Form PCT/ISA/210) and the Written Opinion of the International Searching Authority (Form PCT/ISA/237) issued on Apr. 16, 2012, by the European Patent Office in the International Application No. PCT/EP2011/071919. (7 pages).
International Search Report (Form PCT/ISA/210) and the Written Opinion of the International Searching Authority (Form PCT/ISA/237) issued on Feb. 27, 2012, by the European Patent Office in the International Application No. PCT/EP2011/071664. (8 pages).
Written Opinion of the International Preliminary Examining Authority (Form PCT/IPEA/408) issued on Dec. 13, 2012, by the European Patent Office in the International Application No. PCT/EP2011/071664. (5 pages).
Notification of Transmittal of the International Preliminary Report on Patentability (Forms PCT/IPEA/416 and PCT/IPEA/409) issued on Mar. 8, 2013, by the European Patent Office in the International Application No. PCT/EP2011/071664. (14 pages).
International Search Report (Form PCT/ISA/210) and the Written Opinion of the International Searching Authority (Form PCT/ISA/237) issued on Apr. 12, 2012, by the European Patent Office in the International Application No. PCT/EP2011/071695 and comments filed by the Applicant on May 31, 2012. (10 pages).
International Search Report (Form PCT/ISA/210) and the Written Opinion of the International Searching Authority (Form PCT/ISA/237) issued on Apr. 5, 2012, by the European Patent Office in the International Application No. PCT/EP2011/071785. (9 pages).
Vergnes et al., U.S. Appl. No. 13/992,103, entitle "Method for Exporting Data of a Javacard Application Stored in a UICC to a Host" filed Jun. 6, 2013.
Office Action issued by the U.S. Patent and Trademark Office in the U.S. Appl. No. 13/312,309, mailed Sep. 25, 2013, U.S. Patent and Trademark Office, Alexandria, VA. (13 pages).
Office Action issued by the U.S. Patent and Trademark Office in the U.S. Appl. No. 13/312,309, mailed Apr. 24, 2014, U.S. Patent and Trademark Office, Alexandria, VA. (13 pages).
Office Action issued by the U.S. Patent and Trademark Office in the U.S. Appl. No. 13/991,744, mailed Jun. 2, 2015, U.S. Patent and Trademark Office, Alexandria, VA. (35 pages).
Office Action issued by the U.S. Patent and Trademark Office in the U.S. Appl. No. 13/991,823, mailed Jul. 13, 2015, U.S. Patent and Trademark Office, Alexandria, VA. (21 pages).
Office Action issued by the U.S. Patent and Trademark Office in the U.S. Appl. No. 13/991,912, mailed Jul. 23, 2015, U.S. Patent and Trademark Office, Alexandria, VA. (45 pages).
Office Action issued by the U.S. Patent and Trademark Office in the U.S. Appl. No. 13/992,103, mailed Jul. 13, 2015, U.S. Patent and Trademark Office, Alexandria, VA. (42 pages).
Office Action issued by the U.S. Patent and Trademark Office in the U.S. Appl. No. 13/992,065, mailed Jul. 30, 2015, U.S. Patent and Trademark Office, Alexandria, VA. (32 pages).
Office Action issued by the Chinese Patent Office on Aug. 19, 2015 in corresponding Chinese Application No. 201180058922.2, and English language translation of Office Action (16 pages).
Office Action issued by the Chinese Patent Office on Nov. 4, 2015 in corresponding Chinese Application No. 201180058688.3 (5 pages).
Office Action issued by the U.S. Patent and Trademark Office in the U.S. Appl. No. 13/991,766, mailed Oct. 1, 2015, U.S. Patent and Trademark Office, Alexandria, VA. (27 pages).
Office Action issued by the U.S. Patent and Trademark Office in the U.S. Appl. No. 13/992,039, mailed Oct. 1, 2015, U.S. Patent and Trademark Office, Alexandria, VA. (28 pages).
Office Action issued by the U.S. Patent and Trademark Office in the U.S. Appl. No. 13/991,846, mailed Oct. 15, 2015, U.S. Patent and Trademark Office, Alexandria, VA. (23 pages).
Office Action issued by the U.S. Patent and Trademark Office in the U.S. Appl. No. 14/603,889, mailed Oct. 23, 2015, U.S. Patent and Trademark Office, Alexandria, VA. (36 pages).
Office Action issued by the Chinese Patent Office on Aug. 27, 2015 in corresponding Chinese Application No. 201180058683.0, and English language translation of Office Action. (17 pages).
Office Action issued by the U.S. Patent and Trademark Office in U.S. Appl. No. 13/992,103, mailed Nov. 25, 2015, U.S. Patent and Trademark Office, Alexandria, VA (22 pages).
Office Action issued Nov. 17, 2015 by the Chinese Patent Office in corresponding Chinese Patent Application No. 201180058925.6 (10 pages).

* cited by examiner

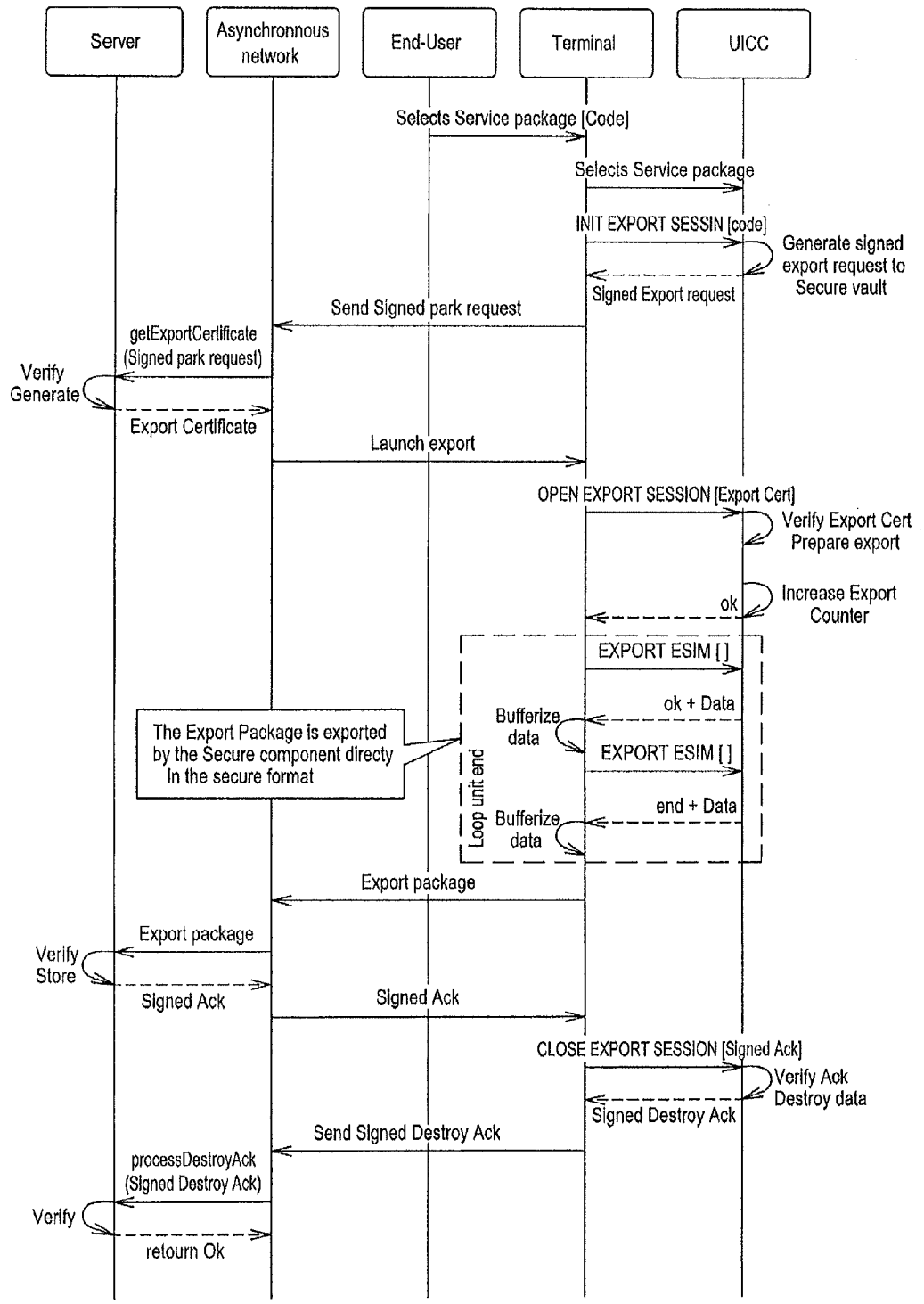

METHOD FOR EXPORTING ON A SECURE SERVER DATA COMPRISED ON A UICC COMPRISED IN A TERMINAL

This disclosure is a national phase of PCT/EP2011/071778, a continuation of U.S. application Ser. No. 13/312,309, filed Dec. 6, 2011, and claims priority of European Application No. 10306359.0, filed Dec. 6, 2010, the disclosures of which are hereby incorporated by reference.

The present invention relates to a method for exporting on a secure server data comprised on a UICC (Universal Integrated Circuit Card) comprised in a terminal.

Secure elements, like UICCs, embed Sim applications. The secure elements can be installed, fixedly or not, in terminals, like for example mobile phones. In some cases, the terminals are constituted by machines that communicate with other machines for M2M (Machine to Machine) applications.

A UICC can be in the format of a smart card, or may be in any other format such as for example but not limited to a packaged chip as described in PCT/SE2008/050380, or any other format. It can be used in mobile terminals in GSM and UMTS networks for instance. The UICC ensures network authentication, integrity and security of all kinds of personal data.

In a GSM network, the UICC contains mainly a SIM application and in a UMTS network it is the USIM application. A UICC may contain several other applications, making it possible for the same smart card to give access to both GSM and UMTS networks, and also provide storage of a phone book and other applications. It is also possible to access a GSM network using an USIM application and it is possible to access UMTS networks using a SIM application with mobile terminals prepared for this. With the UMTS release 5 and later stage network like LTE, a new application, the IP multimedia Services Identity Module (ISIM) is required for services in the IMS (IP Multimedia Subsystem). The telephone book is a separate application and not part of either subscription information module.

In a CDMA network, the UICC contains a CSIM application, in addition to 3GPP USIM and SIM applications. A card with all three features is called a removable user identity card, or R-UIM. Thus, the R-UIM card can be inserted into CDMA, GSM, or UMTS handsets, and will work in all three cases.

In 2G networks, the SIM card and SIM application were bound together, so that "SIM card" could mean the physical card, or any physical card with the SIM application.

The UICC smart card consists of a CPU, ROM, RAM, EEPROM and I/O circuits. Early versions consisted of the whole full-size (85×54 mm, ISO/IEC 7810 ID-1) smart card. Soon the race for smaller telephones called for a smaller version of the card.

Since the card slot is standardized, a subscriber can easily move their wireless account and phone number from one handset to another. This will also transfer their phone book and text messages. Similarly, usually a subscriber can change carriers by inserting a new carrier's UICC card into their existing handset. However, it is not always possible because some carriers (e.g. in U.S.) SIM-LOCK the phones that they sell, thus preventing competitor carriers' cards being used.

The integration of the ETSI framework and the Application management framework of Global Platform is standardized in the UICC configuration.

UICCs are standardized by 3GPP and ETSI.

A UICC can normally be removed from a mobile terminal, for example when the user wants to change his mobile terminal. After having inserted his UICC in his new terminal, the user will still have access to his applications, contacts and credentials (network operator).

It is also known to solder or weld the UICC in a terminal, in order to get it dependent of this terminal. This is done in M2M (Machine to Machine) applications. The same objective is reached when a chip (a secure element) containing the SIM or USIM applications and files is contained in the terminal. The chip is for example soldered to the mother-board of the terminal or machine and constitutes an e-UICC.

The present invention also applies to such soldered UICCs or to such chips containing the same applications than the chips comprised in UICCs. A parallel can be done for UICCs that are not totally linked to devices but that are removable with difficulty because they are not intended to be removed, located in terminals that are distant or deeply integrated in machines. A special form factor of the UICC (very small for example and therefore not easy to handle) can also be a reason to consider it as in fact integrated in a terminal. The same applies when a UICC is integrated in a machine that is not intended to be opened. Such a welded UICC or chips containing or designed to contain the same applications than UICCs will generally be called embedded UICCs or embedded secure elements (in contrast to removable UICCs or removable secure elements). This also applies to UICCs or secure elements that are removable with difficulty.

The present invention concerns the export of sensitive data out of a secure component (UICC chip) to be sent into a secure vault (e.g. a secure server), with no risk of cloning the data, and no direct data link between the UICC and the secure server. More precisely, the invention concerns a method for exporting on a secure server data comprised on a UICC comprised in a terminal.

When changing terminals, like mobile terminals, for example mobile phones, wireless terminals or connected terminals, users want the facility to keep along the services that were enable in their old terminal. These services, such as the cellular services or banking services, are relying on keys and sensitive data loaded in a UICC of the terminal.

If the secure component (UICC) is removable, such as a classic SIM card, and if the new terminal supports such a removable component, then the user can just remove the secure component from the old terminal and insert it in the new terminal.

But if the UICC is not removable (embedded UICC) or if the new terminal does not support this type of component, then there are needs to be a way to move all the keys and data related to that service to the secure component of the new terminal.

Another problem that arises in the case of embedded UICCs is that the old and the new terminal are sometimes not available at the same time. The user wants to secure its sensitive (personal) data and keys before buying his new terminal.

The invention provides a way to securely export the keys and data related to a service to a secure vault, for further download into another (or the same) terminal, in such a way that the keys and data cannot be cloned.

Furthermore, the invention addresses the problem that it may not be possible to establish a direct IP link between the secure vault and the secure component.

To this purpose, the present invention proposes a method for exporting on a secure server data comprised on a UICC comprised in a terminal. The method consists in:

On export request, signing an export request by the UICC, the signed export request being transmitted by the terminal to the server;

Verifying, at the level of the server, the signed export request by comparing the signature and the identity of the UICC;

If the verification is positive, sending by the server an signed export certificate to the UICC via the terminal;

Verifying the export certificate in the UICC and, if positive, preparing an export package containing the data, the export package being signed and encrypted by the UICC;

Sending the export package to the terminal; and set the exported data as "unusable" in the UICC;

Transmitting from the terminal to the server the export package;

Receive the package and verify the signature at the level of the server;

Signing an acknowledgment message and transmit it to the UICC via the terminal;

In the UICC, verifying the acknowledgment message and, if the signature of the server is recognized, destroying the data that have been exported and sending a signed acknowledge message to the server via the terminal;

Verifying the signature of the acknowledge message in the server and, if the signature is recognized, making the data available for a further transfer to a new terminal or UICC.

The UICC is preferably embedded in the terminal and the export request is preceded by a selection of the data to be exported.

The invention will be better understood by reading the following description of FIG. 1 representing a flow chart of a preferred embodiment of the present invention.

The invention integrates an asynchronous connection between the secure component (UICC) and the secure vault constituted for example by a remote server.

In FIG. 1, the end-user of a terminal selects first the data to be exported. These data are for example phone numbers or private keys that the user wants to secure for being able to transfer them later on another (or the same) terminal.

This can be done by selecting an application id or a service id on the UICC. This can be done by the user through an application on the terminal, or automatically through the terminal. This corresponds to an export request formulated by the end-user. Such an export request could also be formulated by the remote server or by the terminal.

Optionally, when selecting the data/service to be exported from the UICC, the user/terminal may have to present a code or to authenticate towards the UICC or the service in order to get access to the data.

The terminal then initiates the export session on the secure component by sending him an "INIT EXPORT SESSION" order.

In response, the UICC returns a "Signed Export request" to the terminal. This request is uniquely identified and signed by the UICC.

The "Signed Export request" is transmitted asynchronously to the server through a network, like an IP, cellular, OTA or OTI network.

At reception, the server verifies the "signed export request", by comparing the signature and the identity of the UICC. The invention does not mandate any particular security scheme, but requires that the server can verify the signature of the UICC.

The server generates then an "Export Certificate". This certificate is uniquely signed by the server, and uniquely identifies the UICC. With this certificate, the server confirms that the UICC is genuine, and that the export process can be initiated.

The "Export certificate" is transmitted asynchronously to the UICC by the terminal.

The UICC then verifies the "Export Certificate". The invention does not specify a particular security scheme, but the UICC must have the ability to verify a signature from the server.

The UICC increases an "Export Counter". This counter is maintained by the UICC.

The UICC prepares an "Export Package". This export package is encrypted and signed by the UICC. In addition, the "Export Package" includes the "Export Counter". The Export Package is sent to the terminal. If necessary (as shown in the diagram), due to I/O limitation between the terminal and the UICC, the Export Package can be sent through multiple commands. After having been sent to the terminal, the image of the transmitted package kept at the level of the UICC is rendered inactive (for avoiding a possible duplication of the package).

The "Export Package" is then transmitted asynchronously to the server. Since it is encrypted, only the server can read it.

Once received, the server decrypts and verifies the Export Package. For each UICC, the server maintains a copy of the Export counter. The Export Counter in the Export Package must be higher than the copy of the export counter maintained by the server, otherwise the export package is rejected. Once the export package has been accepted, the server updates its copy of the Export Counter to match the value in the Export Package.

The server then generates a Signed Ack. This Ack is uniquely signed by the server, and includes the value of the export counter. When having sent this command, the received package is rendered inactive at the level of the server.

The Signed Ack is transmitted asynchronously to the UICC (i.e. through the terminal).

The UICC verifies the received Signed Ack and, if it matches, destroys its copy (image) of the data that have been exported.

The UICC then generates a Signed Destroy Ack, which is uniquely signed by the UICC, and includes the value of the export counter.

The Signed Destroy Ack is transmitted asynchronously to the server.

The server then verifies the Signed Destroy Ack. If it matches, the exported data are available to be imported into another UICC in a new terminal or in the same one later.

The advantages of the present invention are the following:

At every point of the process, the invention provides a nice way to interrupt and rollback the process. Therefore there is no risk of losing the data.

All the process can be done through an asynchronous connection (such as e-mail). There is no need for the UICC to be directly connected to the server.

It is not possible to have cloned information. The data are available in the server only after confirmation that they have been destroyed in the UICC.

The invention claimed is:

1. A method for exporting on a secure server data comprised on a UICC in a terminal, said method comprising:

on export request, signing an export request by said UICC, said signed export request being transmitted by said terminal to said server;

verifying, at the level of said server, said signed export request by comparing the signature and the identity of said UICC;

if said verification is positive, sending by said server a signed export certificate to said UICC via said terminal;

verifying said export certificate in said UICC and, if said verification is positive, preparing an export package containing said data, said export package being signed and encrypted by said UICC;

sending said export package to said terminal and setting the exported data as "unusable" in the UICC;

transmitting from said terminal to said server said export package;

receiving said package and verifying said signature at the level of said server;

signing an acknowledgment message and transmitting it to said UICC via said terminal;

in said UICC, verifying said acknowledgment message and, if the signature of said server is recognized, destroying the data that have been exported and sending a signed acknowledge message to said server via said terminal; and verifying the signature of said acknowledge message in said server and, if said signature is recognized, making said data available for a transfer.

2. A method according to claim 1, wherein said UICC is embedded in said terminal.

3. A method according to claim 1, wherein said export request is preceded by a selection of the data to be exported.

* * * * *